United States Patent [19]

Johnson

[11] 3,757,718

[45] Sept. 11, 1973

[54] METHOD FOR FORMING HOLLOW ARTICLES OF WORK-STENGTHENABLE PLASTIC MATERIALS

[75] Inventor: Herbert G. Johnson, Havertown, Pa.

[73] Assignee: Shell Oil Company, New York, N.Y.

[22] Filed: May 27, 1971

[21] Appl. No.: 147,663

Related U.S. Application Data

[63] Continuation of Ser. No. 819,869, April 28, 1969, abandoned, which is a continuation-in-part of Ser. No. 601,380, Dec. 13, 1966, Pat. No. 3,499,188.

[52] U.S. Cl............... 113/120 R, 72/354, 264/89, 264/94, 264/292, 264/296, 264/310, 264/323, 425/387, 425/400, 425/425

[51] Int. Cl.. B21d 11/04, B21d 51/00, B29c 17/03, B29c 17/07

[58] Field of Search............... 264/89, 294, 296, 264/310; 425/387, 388, 398, 400, 425; 113/120 R; 72/354

[56] References Cited

UNITED STATES PATENTS

| 2,468,697 | 4/1949 | Wiley | 264/DIG. 66 |
|---|---|---|---|
| 2,854,694 | 10/1958 | Mumford | 18/19 |
| 2,878,513 | 3/1959 | Slaughter | 18/19 |
| 3,184,524 | 5/1965 | Whiteford | 264/94 |
| 3,259,942 | 7/1966 | Polins | 264/94 UX |
| 3,324,509 | 6/1967 | Hey et al. | 18/5 |
| 3,341,644 | 9/1967 | Allen | 264/94 UX |
| 3,496,597 | 2/1970 | Ayres | 18/19 F X |
| 3,510,913 | 5/1970 | Edwards | 264/94 X |

FOREIGN PATENTS OR APPLICATIONS

| 332,588 | 3/1959 | Switzerland | 264/94 |

Primary Examiner—Robert F. White
Assistant Examiner—J. H. Silbaugh
Attorney—Martin S. Baer

[57] ABSTRACT

This application discloses method and apparatus for forming flanged hollow articles of solid-work-strengthenable tenaciously stretchable plastically flowable materials, particularly crystalline polymers, such as polyethylene polypropylene, and the like, and article made thereby, wherein a female die unit with a tubular portion has an annular (but not necessarily always circular) peripherally confined blank-holding recess seat at one end, the female die unit being formed of separable parts, when desired; wherein independently power-actuated rim-clamping means having axial movement clamp a rim portion of a blank securely in said recess seat against pull-in and with the added function of squeezing inventory material of the rim inwardly, when desired; and wherein an independently power-actuated axially movable article-forming plunger moves through said clamping means, preferably being guided thereby said sealed, to force the unclamped inner portion of the blank through the female die unit to pull bottom inventory material outward without extrusion action to form the sidewall of the article.

An opposed cooperating independently power-actuated axially movable bottom plunger may be provided to act against the bottom of the blank to control its shape during and at the end of the forming action, and, if desired, to eject the formed article. Means may be provided for supplying to or removing fluid from one or both sides of the blank to assist the flow of material and in ejection of the article, when desired. The arrangement of the rim-clamping means relative to the sidewall of the tubular portion of the female die unit and the shape of the forming plunger assist in the flow of material and in establishing the desired thickness of the sidewall of the article.

Means also may be provided for biaxially working the material in the rim, as by circumferential movement of pressure means acting thereon.

17 Claims, 9 Drawing Figures

PATENTED SEP 1 1 1973

INVENTOR.
HERBERT G. JOHNSON

INVENTOR.
HERBERT G. JOHNSON

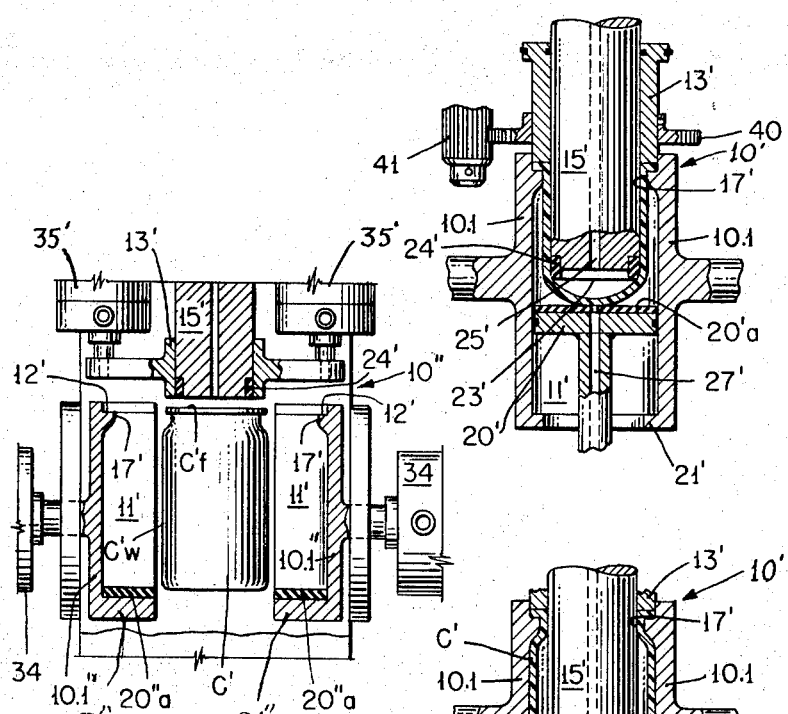
Fig.6
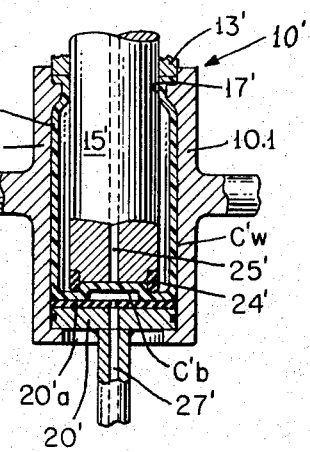
Fig.7
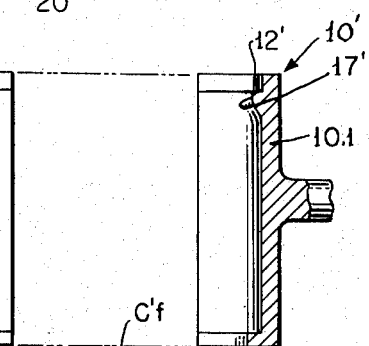
Fig.8
Fig.9
INVENTOR.
HERBERT G. JOHNS

METHOD FOR FORMING HOLLOW ARTICLES OF WORK-STENGTHENABLE PLASTIC MATERIALS

RELATED APPLICATIONS

This application is a streamlined continuation of co-pending application Ser. No. 819,869, filed Apr. 28, 1969, now abandoned, which is in turn a continuation-in-part of copending application Ser. No. 601,380, filed Dec. 13, 1966 now U.S. Pat. No. 3,499,188, Mar. 10, 1970.

BACKGROUND OF THE INVENTION

This invention relates to method for forming hollow articles of solid-work-strengthenable plastic materials and the article and has for an object the provision of improvements in this art.

The invention is applicable to various plastic materials, such as plastic polymers and certain metals, but is particularly applicable to plastics of the kind which can be strengthened by being worked in the solid state. The term "solid-working" is used herein. The term "cold-working" is also used at times for convenience since the effects of solid-working of some materials are similar to those produced by cold-working various metals and since "cold-working" is coming to be applied to such solid-state strengthening phenomena. The term "cold-working" seems to be applicable, although certain plastics are subject to strength improvement by working in the solid state at relatively high temperatures, as for example, several hundred degrees F. for PTFE (poly-tetra-fluoroethylene), one of the better known fluorocarbon polymers.

Some of the synthetic plastics which are suitable for use under the present invention are fluorocarbon polymers, polyamides, polyesters and polyolefins. Polypropylenes, in particular, are subject to strength improvement to a remarkable degree by solid-working procedures, either uniaxially or biaxially. The present invention provides for strengthening in the axis or axes preferred, as may be most suitable for the article produced.

SUMMARY OF THE INVENTION

According to the present invention, a method is provided for making flanged hollow articles from a flat sheet blank in a single continuous procedure.

The blank may be referred to as a sheet, plate, billet, or disk. In the simplest aspect of the invention, the outer edge of a blank is gripped around its periphery or rim against a transverse seat in an axial peripherally confined recess by an annular blank-holding or clamping means and the inner portion is moved along axially as inventory material by the forward end of a central forming plunger through an annular orifice which, when desired, is arranged to be radially thinner than the blank and as thick radially as the thickest part of the sidewall of the container to be formed, to form a hollow article having a reduced top flange thickness and a sidewall which has been solid-worked by controlled stretching of the inner bottom inventory material.

In a specific aspect, the inner edge of the clamping means overhangs the sidewall of the tubular portion of the female die unit at the recess seat and guides the forward end of the forming plunger relative to the female die unit to provide an annular (not necessarily circular) orifice which defines the maximum thickness of the sidewall of the forming article. This means, as shown in the drawings, that the width of the orifice is less than the depth of the seat recess and, in desired cases, is made to be of less width than the thickness of the blank. Means are provided for supplying to or removing fluid from one or both sides of the blank to assist in controlling the flow of material and removing the formed article.

The bottom may be further worked and shaped between the forming plunger and a cooperating reaction member at the end of the body-forming stroke, the thickness of the bottom depending on the length of the side-forming stroke as related to the original thickness of the blank, the size of the annular die orifice, and other factors, such as relative friction of material with the forming die, and the like, to be discussed hereinafter.

In another aspect of the invention, the blank-holder-gripped portion or periphery of the blank and the bottom may be retained with the sidewall portion to form a closed-bottom container with a top-strengthening rim; or the tubular worked portion may be cut off from the rim and bottom and used as a tube, especially when it has been drawn out to considerable length, as is possible by the present procedure and apparatus.

As another aspect of the invention, the rim is compressed, as by axial or radial forces, or both, to thin it and force some of its supply or inventory material into the inner portion of the blank and thereby give the rim and adjacent portions of the article the characteristics of solid-worked material.

As another aspect of the invention, the rim and adjacent sidewall is not only worked axially and radially, but also is caused to flow peripherally so as to acquire biaxial orientation strengthening whereby to overcome the directional weakness characteristic of uniaxial orientation.

As another aspect or object of the invention, the tubular portion may be expanded and shaped to give it greater circumferential strength by a secondary action after initial formation and while the material is still substantially at the same working temperature.

Another object is to provide apparatus which has a rapid working cycle and which delivers the formed article in a convenient manner relative to the location of the machine components.

Another object is to make a laminated or multi-walled article of the same or different layer materials.

Another object is to make a container having a rim with predetermined irregularities on its outer surface, such as projections, indentations, or the like, for screw or snap tops, bails, or the like.

DRAWINGS

The above and other objects of the invention, as well as various features of novelty and advantages, will be apparent from the following description of certain exemplary embodiments, reference being made to the accompanying drawings, wherein:

FIG. 6 is a section of a central portion of FIG. 5, showing a stage of the article forming action;

FIG. 7 is a section like FIG. 6 showing the stage at article completion;

FIG. 8 shows the state when the article is being removed;

FIG. 9 is a partial view like FIG. 5 but with the opposed plunger omitted.

SPECIFIC EMBODIMENTS

Figure 1:
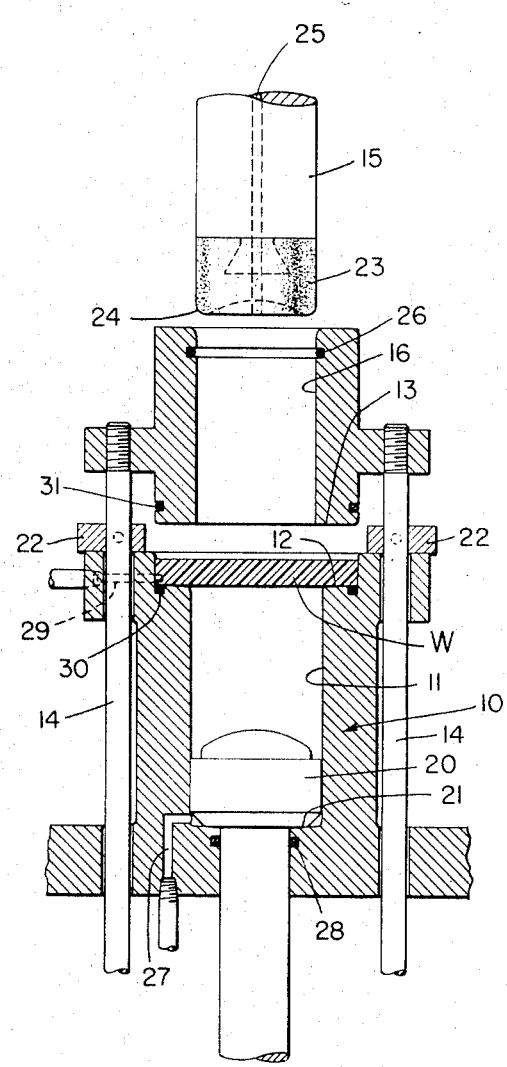
FIG. 1 is an axial section through one form of press apparatus embodying the invention, the parts being shown in retracted position with a sheet blank or billet introduced but with power actuating means being omitted.

Referring to FIGS. 1 to 4, a forming press comprises a female die unit 10 having a cavity or chamber 11 and an annular peripherally confined recess seat 12 for a plate-like blank W. Axially movable blank-holding and compressing means, such as an annular plunger 13 is suitably mounted, as on guide rods 14, to enter the enlarged seat recess portion of the die chamber and clamp the annular outer edge or rim of the blank upon the annular seat 12.

A forming plunger 15 is arranged to move axially through the inner cylindrical opening 16 of the annular rim plunger 13 to engage the interior portion of the blank W within the outer annular clamped rim portion, an annular space or orifice 17 being provided (FIG. 2) between the inner edge of the seat and the outer periphery of the forward end of the forming plunger 15. As here shown, the clamping means extends inward to closely confine and accurately guide the forming plunger and also prevent upward flow of material if the clamping means thins the rim to force inventory material inward after the forming plunger has engaged the blank.

This annular orifice space 17, when desired, is made thinner radially than the original thickness of the blank and approximately the thickness of the thickest part of the sidewall Cw of the container C (FIGS. 3 and 4) which is to be formed. This leaves substantially the entire inner body of the blank beneath the lower end of the plunger as bottom inventory or reservoir material to be drawn out from beneath the lower end of the plunger to form the sidewall of the container as the forming plunger advances into the forming chamber.

An opposed axially movable independently power-actuated cooperating plunger 20 is slidably mounted in the die chamber and, if desired, may be raised to engage the lower surface of the blank at the start of or during the forming operation. However, the upward pressure of the cooperating opposed plunger is relatively slight so that it will have substantially no compression extruding effect on the free outward flow of blank inventory material from beneath the forming plunger. When the article is fully formed the bottom of the end of the opposed plunger, after being pushed down by the forming plunger with only slight resistance, engages an annular stop seat 21 of the female die unit (FIG. 3) so as to form the bottom Cb of the article under pressure from the forming plunger. The end of the opposed plunger may, if desired, be covered with a low-friction low-thermal-transfer material.

The clamping means or plunger 13 engages the outer edge of the blank with sufficient axial pressure to hold it securely against pulling out as the article is formed but it may leave the rim at different thicknesses, as desired, from substantially the full thickness of the original blank down to a very thin rim. As shown, the rim is left with a thickness about the same as that of the sidewall of the formed container. Stops 22 of any suitable selectable replaceable nature may be provided for limiting the downward movement of the clamping plunger, herein the stop means being shown as insertable washers of selectable thickness.

The pull-out of reservoir or inventory material from beneath the forming plunger 15 is affected by the shape of the plunger, the relative frictional character of the material-engaging surface of the material and plunger, and other factors, to be discussed. The tip 23 of the plunger herein shown (FIGS. 1-4) is of a low-friction low-thermal-transfer substance, such as a rubber-like material, and has a rounded outer edge 24 for the easy flow of material. A fluorocarbon polymer coated plunger end may be desirable.

Here the forming plunger is provided with an axial fluid passage 25, as for air or other desired fluid. Fluids having lubricating effects may be used. An O-ring seal 26 is provided between the forming plunger 15 and the clamping plunger 13 to aid in retaining fluid. Fluid may be supplied to or withdrawn from beneath the blank in the forming space past the opposed plunger, as by a chamber duct 27, a retaining O-ring seal 28 being provided around the stem of the opposed plunger.

The pull-out of material from beneath the forming plunger is affected by: a. the temperature and composition of the material itself; b. the rate of advance of the forming plunger; c. the temperature of the forming plunger; d. its shape; e. the frictional character of its material-engaging surface with the material being formed; f. the character and temperature of the fluid supplied to or withdrawn from the space between the upper surface of the blank and the bottom of the forming plunger; and g. the control of the opposed plunger and the fluid supplied to or withdrawn from the space between it and the lower surface of the blank. As shown, the forming plunger has a concave blank-engaging end which tends to limit blank contact to the rounded annular outer portion and provides fluid space between the blank and the end of the plunger. A PTFE coated plunger has a very low frictional characteristic, especially with a low-friction blank material.

Figure 2:
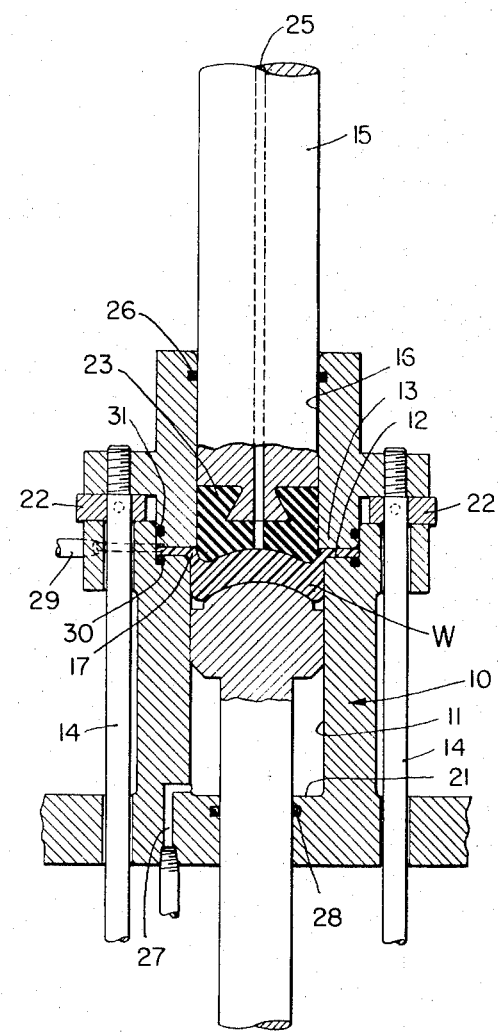
FIG. 2 is a view like FIG. 1 but with an annular blank-holding plunger closed on the blank rim and material of the rim extruded inwardly.
Figure 3:
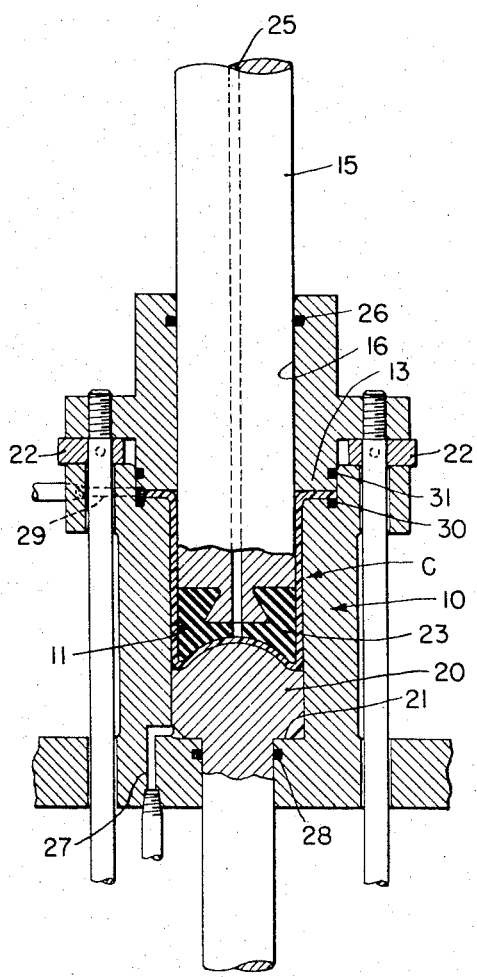
FIG. 3 is a view like FIG. 1 but showing the article, here a cup-shaped article, in fully formed condition.
Figure 4:
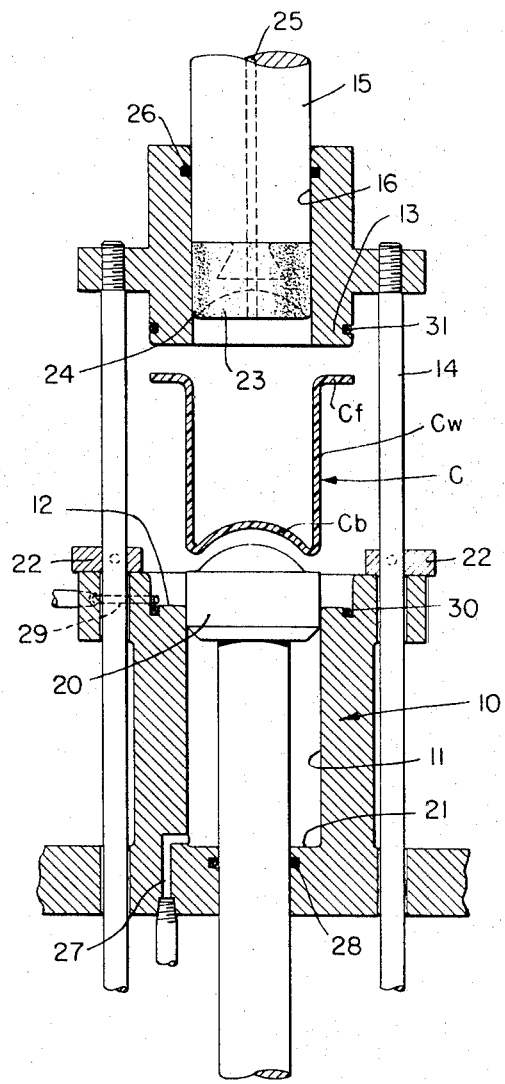
FIG. 4 is a view like FIG. 1 but showing the press open and the article ejected.

It may also be desirable to supply fluid around the rim of the blank to inhibit sticking and to aid the inward flow of material by extrusion when compressed axially by the clamping plunger. For this purpose, radial ducts 29 are provided, O-ring seals 30 and 31 being provided to inhibit fluid leakage. This is more important when the article flange Cf is relatively very wide and it is to be reduced materially in thickness to supply material to be drawn, as from a second supply or inventory of material, that in the rim, into the side wall of the container. Preferably, when there is considerable body or inventory of rim material, this is compressed axially and forced inward gradually as the forming plunger moves down to form the sidewall of the container. In the case of FIGS. 1 and 2, where the rim is narrow and the annular orifice is narrow, the rim material is preferably forced inward before or during the early part of the descent of the forming plunger. In no case is the outer edge of the blank drawn inward bodily as is done in many sheet metal cupping operations where the material of the blank is not much thinned. The inner side of the seat recess is freely open for the inflow of rim inventory material by extrusion caused by axial compression.

The opposed plunger can be brought up at any time desired to act against the bottom of the blank beneath the forming plunger to control the outflow of material around the outer edge of the forming plunger and to control ballooning of the blank beneath the forming plunger when a ballon or bubble of material is formed by fluid pressure beneath the forming plunger. The opposed plunger, depending on its position, limits the length of such a bubble and inhibits it from forming a point and thereby increasing the drag off the outer edge of the forming plunger.

SECOND EMBODIMENT

FIGS. 5-8 show a modified form in which the female die unit 10' is formed by laterally separable parts 10.1, 10.1, each operated by a controlled power device 34. The chamber 11' is larger than the initially formed body of the article or container C' and the sidewalls C'w and bottom C'b of the article are expanded by air through a passage 25' in the forming plunger 15' after the article is initially drawn out. An annular seat 12' in an axial recess is provided for supporting the outer edge of the blank W' and the container flange C'f when the die parts 10.1 are pushed together.

An annular clamping means in the form of a plunger 13' is actuated by a power operating device 35. The forming plunger 15' is actuated by a power device 36. After an article has been drawn down and expanded laterally it is moved down, as by continued application of air through the forming plunger, upon a transfer device such as a moving belt 37 or it may be dropped down on a suitable chute. A pusher 38 operated in controlled timed manner, as by a power device 39 may be used to move the article over upon the belt 37.

The space 17' between the forming plunger and the inside edge of the shoulder of the seat 12' may, if desired, be restricted to a thickness less than that of the original blank and approximately the maximum thickness of the sidewall of the article to be formed so that the body of the blank within the annular clamping plunger is carried down as inventory beneath the forming plunger to be drawn out around its curved outer edge to form the sidewall of the container.

An opposed cooperating bottom reaction plunger 20' is provided for engagement with the lower surface of the bottom of the blank to assist in controlling the formation of the article. Fluid for the space between the end of the plunger 20' and the lower surface of the blank may be supplied or withdrawn by a passage 27' through the stem or rod of the plunger. The plunger 20' is operated in controlled manner by a power actuating device 32.

The form shown in FIGS. 5-8 includes means for biaxially working the material of the flange C'f of the article C'. Here the annular rim-clamping plunger 13' is provided with means for rotating it to work the material of the rim circumferentially during or after formation, or both.

As shown, the annular clamping plunger 13' is provided with a ring gear 40 fast thereon which meshes with a splined gear 41 fast on a shaft 42 driven by any suitable means, such as by a belt 43 mounted on a shaft pulley 44 and a power shaft pulley 45 driven by any suitable motor M with suitable timing controls.

The divided die unit of FIGS. 5-8 is especially suited for making containers with rims having external irregularities, such as projections or depressions, for screw or snap tops, bails, or the like, the separable parts of the die providing ready release for such shapes after their formation in the die parts when closed together.

Figure 5:
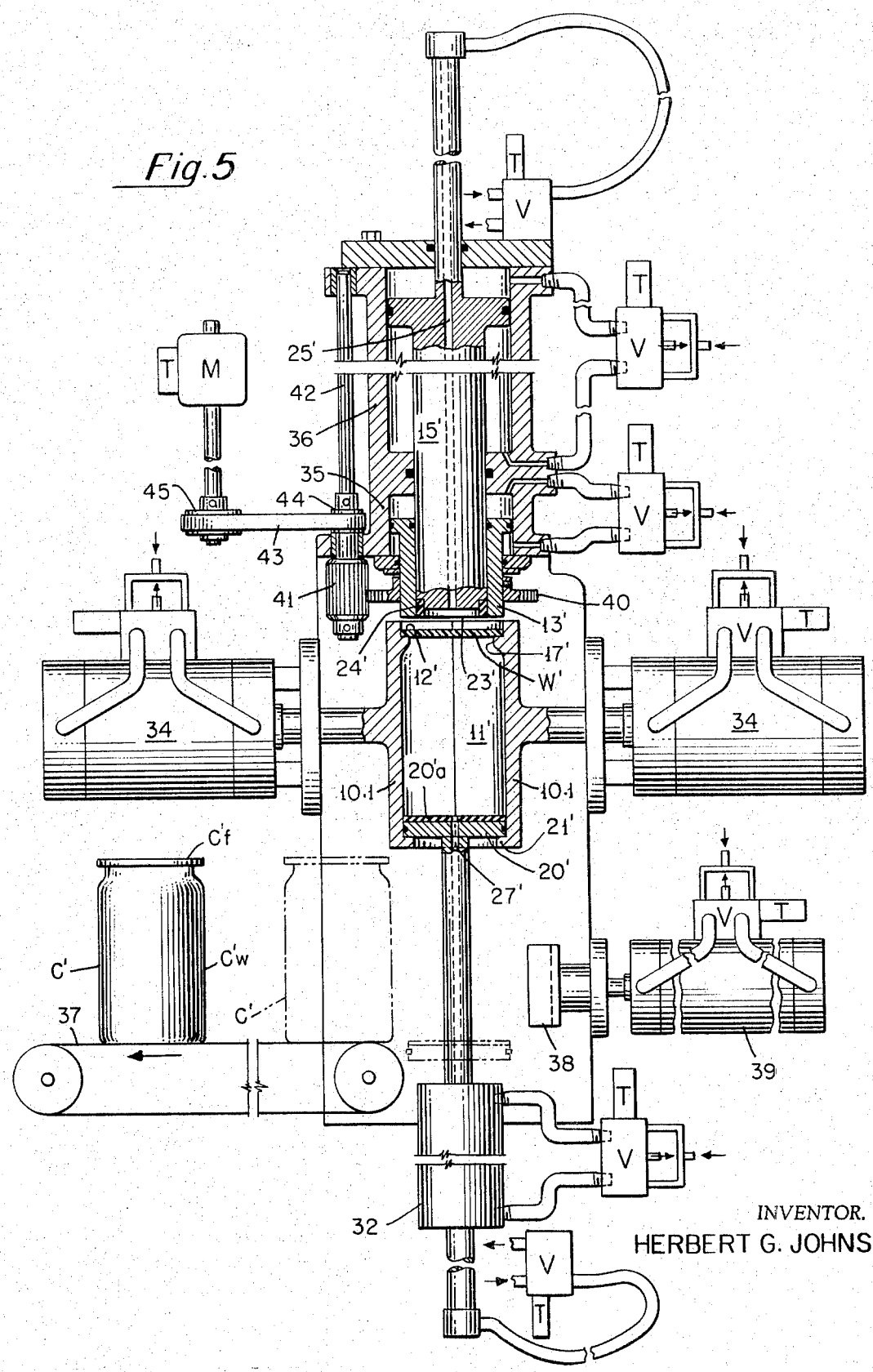
FIG. 5 is a vertical section and elevation of a machine for making re-entry and expanded shapes and for working the rim circumferentially.

Although controls for power actuating devices are now so conventional and well known to those skilled in the art that it is quite common to omit illustration of them, certain controls are sketchily indicated in FIG. 5 for coordinating the various operating elements to provide a very wide range in selectivity of action and timing. The valves are all designated as V and the settable timers are all designated as T, even for the clamp-plunger rotating motor M, it being understood that they may be specifically different for various power devices and for the fluid supply and exhaust (including vacuum, where desired) for the plungers 15' and 20'. The timers T are shown as separate units for the various power devices but they may be combined at a single master timer unit, as is common.

Although not shown, it is to be understood that the various elements which engage the workpiece may have temperature control means, such as fluid passages, resistor elements, or the like, in known manner.

The annular raised outer edge 24' of the forming plunger of FIGS. 5-8 is preferably made of an insulating low-friction material, as in FIGS. 1-4, to ease the flow-out of material and minimize chilling so that the sidewall of the article will not have undesired thickened portions. The upper end of the opposed reaction plunger 20' is also preferably provided with an insulating covering 20'a to minimize chilling of the bottom of the blank which it engages. The material of this covering may be a fluorocarbon polymer, an oxide-coated PTFE impregnated material, rubber-like material or other materials known and used where low-friction and good heat insulation are desired.

The form shown in FIG. 9 is largely like that of FIGS. 5-8 except that the opposed plunger 20' is not used, the divided parts 10.1'' of die unit 10'' having a full bottom 21'' and bottom covering 21''a when closed. Other unchanged parts are designated by the same reference characters.

The blanks W or W' may be formed of a single homogeneous thickness of material or may consist of laminae of the same or different kinds of material to make articles either of a single material, integral or laminar, or of laminae of different materials selected for the desired characteristics of the article. OPERATION With the clamping plunger and forming plunger in raised position, and the die unit parts closed together, if separable, a blank, at proper temperature, is placed on the seat 12 or 12', in the annular seat recess. The annular clamping plunger is brought down on the outer edge of the blank with at least enough pressure to hold the edge against bodily pull-in.

Then the forming plunger is brought down on the blank, being accurately guided by the annular clamping means, and then moved on down to carry blank inventory material downward. Fluid may be supplied through the forming plunger to cause the material to form a bubble or balloon off the hollow bottom of the forming plunger. This aids the feed out of material from below the bottom of the forming plunger.

At any time after the forming plunger engages the blank, the opposed plunger may be brought up to engage the bottom surface of the blank, and fluid may be supplied between the end of the opposed plunger and the bottom surface of the article at any time during draw-down or thereafter, as to assist in imparting the proper bottom shape to the article, for example, to force material up into the bottom concavity of the forming plunger. If the material has been ballooned downward this action of the opposed plunger prevents the bottom from forming a point, that is, flattens the balloon or bubble, and causes the material to flow off more easily around the outer corner or end periphery of the forming plunger. This allows the sidewall of the article to be drawn out in tension between the clamped rim and the bottom.

If the annular orifice is thinner than the blank, the first action of the forming plunger thins the material in shear through the orifice. The thickness of the remainder of the sidewall is established by drawing out bottom inventory material until the sidewall reaches the part initially formed.

During sidewall formation, especially with thick blanks and wide rims, the clamping plunger may be moved down further to any desired extent to compress the rim material and extrude rim inventory material inward to be drawn down into the sidewall as the forming plunger advances. The recess space for the rim above the seat is unobstructed inwardly to permit free inflow of material extruded from the rim. The recess enclosure on the outer side prevents outward flow of material. This avoids cracking or rough edges of the rim and this is particularly helpful when the rim is worked circumferentially.

The opposed plunger is retracted as the forming plunger advances and finally comes to a stop at a position which defines the desired length of the article. In the form of FIGS. 1–4, the bottom position of the opposed plunger is defined by the bottom seat 21. In the form of FIGS. 5–8, the opposed plunger may be stopped by a narrow ledge seat 21', although the power means may provide the stop position, particularly if non-compressible liquid power fluid is used.

In the first form where the article is not enlarged laterally, the forming plunger is moved down continuously until the bottom is formed by compression, and the article is then removed upwardly.

In the second form where the article is expanded laterally, the forming plunger 15' slows near the bottom after the opposed plunger has moved fully to the bottom and then fluid under high pressure is introduced into the article, as through the forming plunger, to expand the article laterally and force down the bottom material as required to conform to the die unit space provided. Then the forming plunger advances to compress the bottom to final shape. Enough holding time is provided, depending on the type of blank material and operating conditions, to prevent spring-back. This time may vary from 1 to 20 seconds or more and can readily be determined by tests.

While the article is being formed the rim may be worked circumferentially, along with such thinning as desired, during the same time or earlier, as may be desired. Or the rim may be worked circumferentially after the article has been otherwise formed.

Thereafter, as illustrated in FIGS. 5–8, the forming and clamping plungers are withdrawn, air being admitted if desired, within the article to break the vacuum or blow off the article, the die parts then being separated enough to clear the opposed plunger and article, and the opposed plunger is moved on down with the article until the bottom transfer position is reached, suction being applied if desirable, to hold the article on the descending opposed plunger. Then the article is moved off by hand or by the pusher 38 to some transfer means, here shown as the belt 37.

The opposed plunger is then moved back up to the FIG. 5 position at the bottom of the die unit, or higher if desired, and the die parts are brought back together ready to take another blank.

The method of this invention is applicable to plastic materials which can be strengthened by being worked in the solid state; such working including working under tension. Such materials are characterized by having a positive slope of a portion of the curve of true tensile strength vs. strain beyond the tensile yield point and above the tensile yield stress, and by having a true ultimate tensile stress which is greater than the true tensile yield stress. Typical polymers of this type, e.g., crystalline polypropylene, are characterized by a tensile stress-strain curve which shows a reduction of tensile stress immediately following the first yield point, a drop in tensile stress to the second yield point, and a subsequent rise in tensile stress substantially above the first yield point. Such polymers are characteristically employed for use as textile fibers and are characterized by the draw-down or necking effect which results in a thinning of an article, such as a fiber, upon drawing in the solid state to a reduction in area which is characteristic of the polymer.

The preferred materials for use in the method of this invention are crystalline thermoplastic organic polymers having the above-defined properties. Crystalline polymers are those in which a substantial part of the polymer, e.g., from 30 to 70 percent or more, is present in the crystalline state as determined, for example, by X-ray analysis. Crystalline polymers are also characterized by having a measurable melting point.

Such crystalline polymers are, for example, fluorocarbons, crystalline polyolefins, polyamides (nylon), polyesters, and the like. The invention is particularly advantageous for use with polyolefins such as commercial, prevailingly isotactic polypropylene, crystalline polypropylene modified for impact improvement, including block copolymers with other olefins, and high density polyethylene. Other plastics which appear to be suitable for forming in accordance with the present invention are polyvinylidene chloride, crystalline (isotactic) polystyrene, polyethers, ionomers, polycarbonates, polyphenylene oxide, polysulfone, polyurethane, and possibly others which have not yet been investigated.

As stated, the sheet blank may comprise one or a plurality of laminae of the same or different materials, and may have plastic and metal laminae combined in various ways. If laminated blanks are used the working temperature is kept within limits which will avoid injury to the components of lower melting point, especially if located externally where they will be engaged by working tool surfaces.

Forming in accordance with this invention is carried out at a temperature at which the polymer exists in the solid state, i.e., below the crystal melting point of crystalline polymer. It may be desirable to form crystalline polymers at an elevated temperature, provided it is substantially below the crystalline melting point, e.g., 5°F or more below said melting point. It is essential that the polymers remain in the solid state in order to achieve the desired strengthening effect.

Suitable working temperature are readily determined for each work-material. Illustrative of those considered most suitable for working prevailingly isotactic polypropylene, which are in the range from about 150°F to just below the crystalline melting point of 335°F, a preferred range is between about 300°F and about 330°F. These temperatures are in the solid state or cold-working range in which isotactic polypropylene is work-strengthenable.

When the opposed plunger is omitted in the divided die unit embodiment, as shown in FIG. 9, it is preferable to separate the die parts while the article remains on the forming plunger (at times referred to as the forming body) and then to blow the article downward off the forming plunger by pressure fluid delivered through the forming plunger.

When the opposed plunger is omitted in the form of die unit shown in FIG. 1, it is preferable to withdraw the forming body or plunger from the article while the article remains in the mold or die unit, using pressure fluid delivered through the forming body or plunger to aid the separation; then discharge the article upwardly by pressure fluid delivered through fluid ducts which are retained in the bottom of the die unit. The same ducts evacuate air from the die unit as the article is being formed.

Sheet blanks, including laminated sheet blanks, may vary from very thin, say 0.01 inches or less, up to 1 inches or more, depending upon lateral area, pressure, depth of draw, and other factors.

Unless deliberate temperature variation is utilized, the blank is preferably heated to a substantially uniform temperature, e.g., not varying by more than 2° F from the desired value across the surface of the blank. Suitable heating means are contact heaters, e.g., hot plates, or radiant heaters.

Working pressures will range from about 100 to 500 psi or more, depending on the kind, thickness, temperature of the blank material and other factors. A holding time of about 1 to 15 seconds is usually sufficient to set the material to shape and avoid spring-back. Experience readily determines the time of set.

While certain embodiments of the invention have been described for purposes of illustration, it is to be understood that there may be various embodiments and modifications within the general scope of the invention.

I claim as my invention:

1. The method of forming a hollow flanged cupped article of a material which is strengthenable by working in the solid state from a sheet blank, which comprises: gripping the peripheral rim portion of a sheet blank of said material, which is in the solid state at a workable temperature, by relative axial movement between an annular transverse recessed exteriorly-closed seat and a cooperating transverse-ended telescoping clamping means with sufficient pressure to hold the rim portion against bodily pull-in; closely confining the outer periphery of the blank rim in the seat recess while leaving the space interiorly between the seat and clamping means freely open for the inflow of any material which is extruded inwardly from the rim portion by compression; maintaining compression on said rim by said annular clamping means for forcing rim inventory material inward during sidewall formation; engaging the inner portion of the blank, in a state free from compression thinning, by an axially moving forming body to entrain bottom inventory material in tension and substantially free from compression on the end of said forming body; and continuing the axial movement of said forming body relative to the gripped rim to draw out inventory material in tension and substantially free from compression to form the sidewall of the article.

2. The method as set forth in claim 1, which further comprises: compressing the residual bottom inventory material after completion of the sidewall drawing action by continued action of the forming body against a fixed opposed body to form the bottom of the article.

3. The method as set forth in claim 1, which further comprises: controllably increasing the compressing action on the rim portion of the blank after it has been gripped and while the inner portion is being formed into the sidewall in tension and substantially free from compression to extrude rim inventory material inward to further assist in forming the sidewall of the article.

4. The method as set forth in claim 1, which further comprises: working the rim portion of the blank material circumferentially after it has been clamped.

5. The method as set forth in claim 4, wherein the rim portion is worked while the sidewall is being drawn out in tension.

6. The method as set forth in claim 1, wherein the rim of the initial blank is clamped, compressed, and formed in an exteriorly closed seat recess provided on the separable parts of an axially divided die unit; and, after the article has been formed, separating the die unit parts transversely and removing the article.

7. The method as set forth in claim 6, which further comprises: working the rim material circumferentially while positioned in the seat recess of the separable die unit parts.

8. The method of forming hollow flanged articles of a material which is strengthenable by working in the solid state from a sheet blank, which comprises: gripping the peripheral rim portion of a sheet blank formed of said material, which is in the solid state at a workable temperature, by relative axial movement between an annular transverse recessed exteriorly-closed seat and a cooperating annular telescoping transverse-ended clamping means with sufficient axial pressure to hold the rim portion against bodily pull-in; maintaining compression on said rim by said annular clamping means for forcing rim inventory material inward during sidewall formation; engaging the inner portion of the blank, in a state free from compression thinning, by an axially movable forming plunger which forms, with the inner edge of the seat, an orifice of less radial thickness than the thickness of the blank; and continuing the axial movement of the forming plunger relative to the gripped rim to thin the blank in shear through said orifice and entrain bottom inventory material in tension and substantially free from compression on the end of the forming plunger; and by continued axial movement to draw out inventory material in tension and substantially free from compression to form the sidewall of the article.

9. The method of forming a hollow flanged article of a material which is strengthenable by working the solid state from a sheet blank, which comprises: gripping the peripheral rim portion of a blank of said material, which is in the solid at a workable temperature, between an annular transverse seat and a cooperating annular transverse clamping means with sufficient axial pressure to hold the rim portion against bodily pull-in; engaging the inner portion of the blank by an axially movable forming body to entrain bottom inventory material on the end of the forming body; continuing the axial movement of said forming body to draw out bottom inventory material in tension to form the sidewall of the article; and controllably introducing fluid between the lower end of the forming body and the upper surface of the material while the forming body is moving axially to aid the draw-out of bottom inventory material from beneath the bottom of the forming body; the pressure of the fluid introduced being so controlled as to maintain the blank material in engagement with the forward side periphery of the forming body during its sidewall-forming axial movement.

10. The method as set forth in claim 9, which further comprises: increasing the fluid pressure at the end of the sidewall-forming axial movement to further expand the article.

11. The method as set forth in claim 9, which further comprises: engaging the bottom surface of the material beneath the forming body by an opposed body with sufficient pressure to aid in the feed-out of bottom inventory material but not enough pressure to cause extrusion of bottom inventory material.

12. The method as set forth in claim 11, which further comprises: controllably supplying fluid between the opposed body and the bottom surface of the material during article formation.

13. The method as set forth in claim 9, which further comprises: compressing the bottom inventory material at the end of the sidewall drawing action by continued action of the forming body against a fixed opposed body to form the bottom of the article.

14. The method as set forth in claim 13, which further comprises: supplying fluid between the lower surface of the formed article and said opposed body to shape the bottom of the article against the bottom of the forming body.

15. The method as set forth in claim 13, which further comprises: forming the article in an axially divided die unit; and after the article has been formed, separating the parts of the die unit; and moving the formed article axially on said opposed body to move it clear of the forming space for removal.

16. The method of forming a hollow flanged article of a material which is strengthenable by working in the solid state from a sheet blank, which comprises: gripping the peripheral rim portion of a blank of said material, which is in the solid state at a workable temperature, between an annular transverse exteriorly-closed seat and a cooperating annular transverse-ended telescoping clamping means with sufficient axial pressure to hold the rim portion against bodily pull-in; engaging the inner portion of the blank, in a state free from compression thinning, by an axially movable forming body to entrain bottom inventory material in tension and substantially free from compression on the end of the forming body; continuing the axial movement of said forming body to draw out bottom inventory material in tension and substantially free from compression to form the sidewall of the article; and introducing an opposed body against the lower surface of the material but with less pressure than would cause extrusion of bottom inventory material while the forming body is moving axially.

17. The method as set forth in claim 16 wherein fluid is introduced between said opposed body and said lower surface during the time when said opposed body is introduced.

* * * * *